United States Patent [19]

Hoffman

[11] Patent Number: 4,745,153
[45] Date of Patent: May 17, 1988

[54] LOW VISCOSITY, HIGH SOLIDS POLYMER POLYOLS PREPARED USING A PREFORMED DISPERSANT

[75] Inventor: Dwight K. Hoffman, Midland, Mich.

[73] Assignee: The Dow Chemical Company, Midland, Mich.

[21] Appl. No.: 942,657

[22] Filed: Dec. 17, 1986

[51] Int. Cl.$^4$ ............................................. C08G 18/14
[52] U.S. Cl. ................................... 524/762; 521/137; 524/850; 524/852; 528/75
[58] Field of Search ......................... 524/762; 521/920

[56] References Cited

U.S. PATENT DOCUMENTS

| | | | |
|---|---|---|---|
| 4,148,840 | 10/1979 | Shah | 524/388 X |
| 4,198,488 | 4/1980 | Drake et al. | 521/137 |
| 4,242,249 | 12/1980 | Van Cleve et al. | 528/75 X |
| 4,350,780 | 9/1982 | Van Cleve et al. | 528/75 X |
| 4,390,645 | 6/1983 | Hoffman et al. | 521/137 |
| 4,460,715 | 7/1984 | Hoffman et al. | 521/137 |
| 4,623,674 | 11/1986 | Bailey, Jr. | 521/137 |

*Primary Examiner*—Joseph L. Schofer
*Assistant Examiner*—Angela L. Fugo

[57] ABSTRACT

This invention is a process for preparing a polymer polyol comprising the steps of (a) forming in a first step a dispersant by homopolymerizing a vinyl-terminated adduct, or copolymerizing said adduct with an ethylenically unsaturated monomer or mixture thereof which is not a vinyl-terminated adduct, in the presence of an active hydrogen-containing compound as a solvent under conditions such that the resulting dispersant is soluble in a base polyol, and has a Brookfield viscosity of less than about 25,000 centipoises as a 20–35 wt.-% solution in an active hydrogen-containing compound, and (b) polymerizing an ethylenically unsaturated monomer or mixture thereof in the presence of said dispersant and a base polyol under conditions such that the polymerized monomer forms a plurality and particles which are stabilized against agglomeration by the dispersant.

The process of this invention provides for improved stability of the dispersed polymer particles in the base polyol, and provides a polymer polyol of surprisingly low viscosity.

18 Claims, No Drawings

LOW VISCOSITY, HIGH SOLIDS POLYMER POLYOLS PREPARED USING A PREFORMED DISPERSANT

BACKGROUND OF THE INVENTION

This invention relates to polymer polyols, and particularly to polymer polyols containing high levels of dispersed polymer particles, and to a process for their production using a preformed dispersant.

Polymer polyols are dispersions of addition polymer particles in a continuous polyol phase. The presence of the addition polymer particles in the polyol imparts various desirable properties to polyurethanes, particularly flexible polyurethane foams, prepared from the polyol. In particular, the polymer particles act as a reinforcing filler and cell opener in the foam. The polymer particles also improve the ability of a reaction mixture containing the polymer polyol and a polyisocyanate to flow and fill a mold in the production of molded foams.

One problem with the polymer polyol is that the dispersed polymer particles tend to agglomerate and then settle out of the continuous polyol phase. It is therefore desirable to prepare the polymer polyol in such a way that the tendency of the particles to agglomerate is minimized. The most successful approach to date has been to employ a vinyl-unsaturated polyether which is copolymerized with the addition polymerizable monomers to form a dispersant or stabilizer.

For various reasons, it is desirable to prepare a polymer polyol having a high level of dispersed polymer particles. High levels of dispersed polymer particles provide enhanced reinforcement and cell opening. In addition, the production of high solids polymer polyols is economically advantageous, since a smaller amount is needed to obtain an equivalent amount of polymer particles. Thus, the user can purchase a smaller amount of a high solids polymer polyol and dilute it with an additional, less expensive polyol to obtain a lower overall solids level.

These high solids polymer polyols are especially prone to agglomeration and settling. The production of high solids polymer polyols has also been hampered by the high viscosity obtained when the solids level exceeds about 30% by weight. The practical upper limit on viscosity for these polymer polyols is about 12,000, preferably about 10,000 centipoises, since the pumping equipment used by foamers generally cannot handle higher viscosities at an acceptable rate or with acceptable accuracy. This limit, however, is often exceeded with conventional polymer polyols having high solids.

It would therefore be desirable to provide a process whereby a polymer polyol is formed which has a low tendency for its particles to agglomerate and settle out. It is further desirable to provide a polymer polyol which is prepared having, at a given solids level, a viscosity which is as low as possible. More particularly, it would be desirable to provide a process whereby a polymer polyol having 35% or more solids is prepared at a useable viscosity.

SUMMARY OF THE INVENTION

This invention is such a process for preparing a polymer polyol. The process of this invention comprises the steps of:

(a) forming in a first step a dispersant by homopolymerizing a vinyl-terminated adduct, as defined herein, or copolymerizing said adduct with at least one ethylenically unsaturated monomer as defined herein in the presence of an active hydrogen-containing compound as a solvent under conditions such that the resulting dispersant is soluble in a base polyol and has a Brookfield viscosity of less than about 25,000 centipoises at 25° C. as a 20–35 wt.-% solution of the polymer of the vinyl-terminated adduct in an active hydrogen-containing compound, and in a second step (b) polymerizing an ethylenically unsaturated monomer or mixture thereof in the presence of said dispersant and a base polyol under conditions such that the polymerized monomer forms a plurality of particles which are stabilized against agglomeration by the dispersant.

In a particularly notable embodiment, the vinyl-terminated adduct is homopolymerized in step (a) of the process.

In another aspect, this invention is a composition useful for stabilizing dispersed addition polymer particles in a polymer polyol against agglomeration and settling. The composition comprises a 10–90 wt.-% solution of a homopolymer of a vinyl-terminated adduct, or copolymer thereof with at least one ethylenically unsaturated monomer as defined herein, in a monol or polyol.

In another aspect, this invention is a process for preparing a polymer dispersion in a continuous polyol phase comprising the steps of (a) forming a dispersant by homopolymerizing a vinyl-terminated adduct, or copolymerizing said adduct with an ethylenically unsaturated monomer or mixture thereof under conditions such that the resulting dispersant is soluble in a base polyol and has a viscosity of less than about 25,000 centipoises, and then (b) polymerizing an ethylenically unsaturated monomer or mixture thereof in the presence of said dispersant and a base polyol under conditions such that the polymerized monomer and said dispersant form a plurality of particles dispersed in said base polyol.

In still another aspect, this invention is a composition useful for stabilizing a polymer polyol, comprising a homopolymer of an ethylenically unsaturated adduct of a difunctional material and a monol or polyol, or a copolymer thereof with at least one other ethylenically unsaturated monomer, wherein said dispersion has a viscosity of less than about 25,000 centipoises, and said dispersion is soluble in a base polyol.

The process of this invention provides for improved stability of the dispersed polymer particles in the base polyol, and provides a polymer polyol of surprisingly low viscosity. Accordingly, polymer polyols having solids contents of up to 45% or more, having viscosities sufficiently low readily to permit their processing, can be prepared according to this invention. Another advantage of this invention is that in preparing a polymer polyol, very low amounts of relatively expensive free radical initiators are required to obtain a stable, low viscosity dispersion. A further advantage is that this process requires no volatile solvents which must be removed from the dispersant or polymer polyol prior to use

DETAILED DESCRIPTION OF THE INVENTION

The process of this invention comprises, as a first step, the preparation of a dispersant by homopolymerizing a vinyl-terminated adduct, or copolymerizing same with at least one ethylenically unsaturated monomer.

The vinyl-terminated adduct employed herein as a starting material is a polymer having a molecular weight of at least about 200, which is soluble in the base polyol used in preparing the copolymer polyol and which contains addition polymerizable, ethylenic unsaturation. Preferably the ethylenically unsaturated monomer is capable of undergoing a free radical vinyl polymerization. Preferably, the vinyl-terminated adduct is a 300–8000 molecular weight poly(alkylene oxide) which contains ethylenic unsaturation. Most preferably, the vinyl-terminated adduct is a 300–8000 molecular weight polymer of propylene oxide and/or ethylene oxide having a hydroxyl functionality of about 0 to about 3, more preferably about 1 to about 2, which contains about 1 vinyl group per molecule. It is preferred that polymers of the vinyl-terminated adduct having a degree of polymerization greater than about 2, more preferably greater than about 4, are also soluble in a base polyol.

Suitable vinyl-terminated adducts are represented by the structure 1:

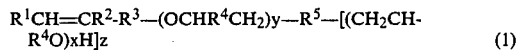
(1)

wherein $R^1$ is hydrogen, inertly substituted lower alkyl, nitrile, $R^8$—OOC— or $R^8_2$NCO—, wherein each $R^8$ is independently hydrogen, inertly substituted lower alkyl, or polyoxyalkylene, $R^2$ and $R^4$ are each independently hydrogen or inertly substituted lower alkyl, $R^3$ is a divalent radical, preferably one which activates the terminal vinyl group towards polymerization, $R^5$ is the residue of a polyhydric inititator when x is greater than zero and a monohydric initiator bond x is zero, y is a number from about 1 to about 100, x is a number from about 0 to about 100 and z is a number from about 1 to about 3. $R^1$ is preferably hydrogen or methyl, with hydrogen being most preferred. $R^2$ and $R^4$ are preferably hydrogen, methyl, ethyl, methylol or nitrile. $R^3$ is preferably phenylene, an ester linkage, a carbamate linkage, —COO(CH2)$_n$O—, —CON(CH2)$_n$O—, —COO(CH2)n—NHCO—, or —CON(CH2)$_n$NHCO—, —C$_6$H$_5$—C(CH$_3$)$_2$ NCO— wherein n is a number from about 1 to about 6. $R^5$ is preferably the residual radical from the polyhydric initiator used in an alkylene oxide polymerization.

Suitable vinyl-terminated adducts according to structure 1 include the reaction product of a monol or polyol and a difunctional material having both ethylenic unsaturation and a group which reacts with an active hydrogen-containing group to form a bond thereto. Suitable such difunctional materials include ethylenically unsaturated isocyanates, acid anhydrides, acid halides, esters and the like. Most preferred are unsaturated isocyanates such as isocyanatoethylmethacrylate (IEM) and (1,1-dimethyl-1-isocyanatomethyl)isopropenylbenzene (TMI).

The monol or polyol contains one (in the case of the monol) or more active hydrogen-containing groups. Suitable active hydrogen-containing groups are those which contain at least one hydrogen atom which displays significant activity according to the Zerewitnoff test described by Kohler in the Journal of the American Chemical Society, vol. 49, p. 3181 (1927). Suitable active hydrogen-containing groups include hydroxyl, amine, mercaptan, carboxylic acid and similar groups. Hydroxyl and amine groups are preferred, with hydroxyl groups being most preferred. The terms "polyol" and "monol" are used herein to conveniently describe all of these active-hydrogen containing materials.

Most preferably, a polyether polyol is used to prepare a vinyl-terminated adduct according to structure 1. The polyether polyol may be the same as the base polyol used in preparing the polymer polyol, or if different, is of such a composition that the adduct formed therefrom is soluble in the base polyol. Preferably, the polyol is a 300-8000 molecular weight hydroxyl-terminated polyether prepared in the polymerization of an alkylene oxide, preferably ethylene oxide and/or propylene oxide, in the presence of a di-, tri- or tetrahydric initiator.

In preparing the vinyl-terminated adduct from a monol or polyol, the monol or polyol is reacted with a difunctional material as described herein under conditions such that a bond between the active hydrogen-containing group on the monol or polyol and the difunctional material is formed, and the ethylenic unsaturation of the difunctional material remains substantially unreacted. In most cases this reaction is conducted at ambient to moderately elevated temperatures (0° to 150° C.) in the substantial absence of a free radical initiator. A catalyst may be used if desired to promote the adduct-forming reaction. In particular, tertiary amines and organometallic compounds as described hereinafter are useful when an ethylenically unsaturated isocyanate is used as the difunctional material.

Most preferably, the vinyl-terminated adduct is as described in U.S. Pat. Nos. 4,390,645, 4,394,491, and 4,460,715, as well as adducts formed in the reaction of a polyol and a (trialkoxyl)silyl ester of acrylic or methacrylic acid, as described in copending application Ser. No. 06/448,082, filed Dec. 9, 1982.

In preparing the vinyl-terminated adduct in the reaction of a difunctional material with a monol or polyol, it is preferred to conduct the reaction so that the majority of the adduct species formed have one vinyl group. Accordingly, the reaction of the difunctional material and the monol or polyol is conducted under conditions which promote the formation of monovinyl adducts. To obtain this level of reaction, a mole of a monol is advantageously reacted with about 0.2–1.2, preferably about 0.8–1.0 mole of difunctional material. When a polyol is employed, it is preferred to react about 0.05 to about 1.5, more preferably about 0.1 to about 0.8, and most preferably about 0.2 to about 0.6 moles of difunctional material per mole of polyol. Generally, a quantity of the monol or polyol remains unreacted and thus forms a solvent for the subsequent polymerization of the adduct. Any unreacted active hydrogens are free to react with a polyisocyanate in forming a polyurethane from the polymer polyol.

In addition, polymers having the structure 2 are also useful as the vinyl terminated adduct:

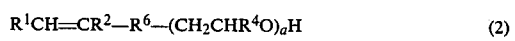  (2)

$$R^1CH{=}CR^2{-}R^6{-}(CH_2CHR^4O)_aH$$

wherein $R^1$, $R^2$ and $R^4$ are as defined before, $R^6$ is a divalent radical which activates the vinyl group toward polymerization and together with the terminal vinyl groups is the residue of an active hydrogen-containing initiator compound, and a is a number from about 1 to about 100, preferably about 10 to about 50. $R^4$ is preferably hydrogen or methyl. $R^6$ is preferably $-COO(CH_2)_nO-$, wherein n is a number from about 1 to about 6. Compounds corresponding to structure 2 include the reaction products of hydroxyethylacrylate or hydroxyethylmethacrylate with from about 1 to about 100 moles of an alkylene oxide.

The vinyl-terminated adduct is then homopolymerized or copolymerized with an ethylenically unsaturated monomer to form a dispersant which is soluble in the base polyol used in preparing the polymer polyol. The relative proportions of the vinyl-terminated adduct and the ethylenically unsaturated monomer (when used) are such that the dispersant has the required solubility. Typically about 0 to 10, preferably about 0–0.2 parts by weight of monomer per part by weight adduct are suitable. The use of small amounts of ethylenically unsaturated monomer, particularly within the preferred ranges, is allowable as long as the dispersant remains soluble in the base polyol. The use of too much of the ethylenically unsaturated monomer can cause the formation of an insoluble dispersant, which is undesirable. In the context of this invention, the dispersant is considered to be soluble in the base polyol if it forms a clear mixture therein at both ambient temperature and at the temperature at which the polymerization of the ethylenically unsaturated monomer to form the polymer polyol is conducted. The formation of a cloudy mixture indicates a lack of solubility.

Suitable ethylenically unsaturated monomers are compounds containing ethylenic unsaturation and which contain no moiety which stabilizes polymers therof against agglomeration when dispersed in the base polyol. Preferably, the ethylenically unsaturated monomer has a molecular weight of less than about 200. More preferably, the ethylenically unsaturated monomer comtains no isocyanate-reactive groups. Most preferably, the ethylenically unsaturated monomer contains no polyether moiety. Exemplary monomers include aliphatic conjugated dienes such as butadiene and isoprene: monovinylidene aromatic monomers such as styrene, alpha-methyl styrene, ar-chlorostyrene, ar-cyano-styrene, and ar-bromostyrene: ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; ethylenically unsaturated nitriles and amides such as acrylonitrile, methacrylonitrile, acrylamide, methacrylamide, N,N-dimethyl acrylamide, N(dimethylaminomethyl) acrylamide, and the like; vinyl esters such as vinyl acetate: vinyl ethers, vinyl ketones: vinyl and vinylidene halides as well as a wide variety of other ethylenically unsaturated materials which are copolymerizable with the aforementioned vinyl-terminated adduct, many of which have heretofore been employed in the formation of polymer polyols as described in U.S. Pat. Nos. 3,832,201 and 3,383,351, incorporated by reference. Mixtures of two or more of the foregoing monomers are also useful herein. Of the foregoing monomers, the vinyl aromatic monomers, particularly styrene, and the ethylenically unsaturated nitriles, particularly acrylonitrile, are preferred. Most preferred are styrene and mixtures thereof with acrylonitrile at a weight ratio of about 99.5:0.5 to about 10:90.

The polymerization of the adduct, or copolymerization of the adduct and an ethylenically unsaturated monomer to form the dispersant, is advantageously conducted at an elevated temperature in the presence of a free radical initiator. The reaction is conducted in the presence of a monol, polyol or monol/polyol mixture which is miscible with the base polyol. The monol and/or polyol may be material which is unreacted in the preparation of the vinyl-terminated adduct from a difunctional material and a monol or polyol and/or may comprise later-added material. The conditions of the reaction are chosen so that the resulting dispersant is soluble in the base polyol. Typically, organic peroxides, peroxyesters and the socalled azo catalysts are suitable. Such catalysts are advantageously used in an amount to achieve a rapid yet controllable reaction rate, and to promote solubility in the dispersant. Typically, from about 0.1 to about 20, preferably about 2–10, more preferably 4–10, weight percent based on the weight of monomers is used. The use of the generally higher levels of initiator in this step tends to cause the formation of lower molecular weight dispersants, which increases their solubility. The temperature of the polymerization reaction is advantageously about 30°–150° C., although optimal temperatures depend somewhat on the particular monomers and initiators employed. Suitable conditions for the polymerization of ethylenically unsaturated monomers in the production of a polymer polyol are described in U.S. Pat. No. 4,460,715.

A chain transfer agent may also be employed in order to control the molecular weight of the dispersant, and therefore improve its solubility in the base polyol. Advantageously, chain transfer agents are used in conjunction with high initiator levels to control the molecular weight of the dispersant. Suitable chain transfer agents include halogenated compounds, mercaptans, sulfides, disulfides, alcohols and the like as described in The Polymer Handbook, edited by J. Brandrup and E. H. Immergut, John Wiley and Sons, New York (1975).

In this process, the vinyl-terminated adduct is polymerized or copolymerized in the presence of a monol, polyol, or mixture thereof as a solvent. This monol or polyol may be present from various sources. When the vinyl-terminated adduct is prepared by reacting a monol or polyol with a difunctional monomer as described before, a quantity of unreacted monol or polyol usually remains and therefore forms a portion of the solvent. In addition, it is generally desirable for heat transfer purposes to add a quantity of a monol or polyol to the vinyl-terminated adduct prior to its polymerization. This is particularly true when the polymerization of the vinyl-terminated adduct is conducted by a continuous addition process. In such process, it is often highly desirable to add a portion of monol or polyol to the reaction vessel at the start of the reaction for heat transfer and agitation purposes. Because of the presence of the monol or polyol solvent, the dispersant is obtained as a solution of the polymerized or copolymerized vinyl-terminated adduct in the monol or polyol solvent. The polymerized adduct generally comprises about 10–90, preferably about 15–50, more preferably about 20–40 wt.-%, most preferably about 20–35 wt.-% of the dispersant. The term "dispersant" is used herein to designate a solution of the polymer of a vinyl-terminated adduct in a monol or polyol containing at least about 10 wt.-% of the polymer as obtained from the polymerization reaction of the adduct.

When the viscosity of the dispersant is referred to herein, it is meant the Brookfield viscosity of a 20–35 wt.-% solution of the polymerized or copolymerized vinyl-terminated adduct in a monol and/or polyol. In the event that a dispersant containing a higher quantity of said polymer is prepared, the viscosity is that obtained upon dilution with additional monol or polyol to obtain a 20–35 wt.-% solution. The viscosity of a dispersant containing a lower quantity of polymer can be determined by separating the polymer from the monol and/or polyol and then, if necessary, adding additional solvent to provide a 20–35 wt.-% solution. More preferably, the viscosity of a dispersant containing less than 20 wt.-% dissolved polymer can be adequately estimated by experimentally determining the viscosities of dispersants containing varying known amounts of the polymer, and from this data setting up a calibration curve which can be used to correlate the relationship between the amount of dissolved polymer to its viscosity. The calibration curve can be used to accurately estimate what the viscosity of a dilute solution of the polymer would be if concentrated into the range of 20–35 wt.-% dissolved polymer.

When the dispersant is prepared using a volatile solvent, such solvent is removed prior to measuring viscosity. The dispersant of this invention advantageously has a viscosity of about 300 to about 25,000 centipoises, preferably about 300 to about 8,000 centipoises, more preferably about about 500 to about 4500 centipoises and most preferably about 500 to about 2500 centipoises at 25° C.

Inert solvents such as volatile organic solvents can be used in preparing the dispersant, but are generally not necessary due to the low viscosity of the dispersant and are disadvantageous in that they must be removed before or after forming the polymer polyol. For this reason, such solvents are not preferred and are most preferably excluded.

The polymerization of the ethylenically unsaturated monomer to form the dispersant can be conducted batch-wise, but is preferably conducted by continuously adding the monomer and adduct to the reaction mixture. The use of a continuous addition process tends to give better control of the reaction and to provide a more uniform molecular weight distribution in the adduct.

Following the preparation of the dispersant, an additional amount of anethylenically unsaturated monomer is polymerized in the presence of the dispersant and the base polyol to form a polymer polyol. The ethylenically unsaturated monomer used in this step may be the same or different than that used in the preparation of the dispersant. However, those monomers described herein as being useful in preparing the dispersant are also useful in preparing the polymer polyol.

The base polyol is a material or mixture of materials containing a plurality of groups containing at least one active hydrogen atom. The term base polyol is used herein to designate the polyol or mixture thereof which constitutes the major proportion of the continuous phase of the polymer polyol. Preferably, the base polyol contains an average of from about 2 to about 16, more preferably about 2 to 8, and most preferably about 2 to about 4 such groups per molecule. In addition, the base polyol advantageously has an equivalent weight from about 70 to about 4,000, preferably from about 500 to about 2,500. Such preferred equivalent weight polyols provide polymer polyols which are especialy suitable for preparing flexible polyurethanes. In general, the preferred equivalent weight polyols exhibit a lower viscosity than higher equivalent weight polyols of the same functionality, and therefore tend to reduce the viscosity of the product polymer polyol.

Polyols which are suitable as the base polyol include those described in U.S. Pat. No. 4,460,715, incorporated herein by reference. Preferred polyols are the polyether polyols, the polyester polyols, hydroxy-functional acrylic polymers, hydroxyl-containing epoxy resins, polyhydroxyl-terminated polyurethane polymers, polyhydroxyl-containing phosphorus compounds and alkylene oxide adducts of polyhydric thioethers. Most preferred, on the basis of cost and availability, are the polyether polyols and the polyester polyols. The most preferred polyether polyols are 500 to 2500 equivalent weight polymers of $C_2$ to $C_4$ alkylene oxides, especially $C_2$-$C_3$ alkylene oxides.

The ratios of base polyol, dispersant and monomers used to prepare the polymer polyol are chosen to provide the product with the desired solids level. Typical solids levels obtained with this invention are in the range from about 5 to about 60, preferably about 20 to about 55, and more preferably about 35 to about 50% by weight of the polymer polyol. The "solids level" means the weight percent of the composition which is in the form of polymerized ethylenically unsaturated monomers.

Generally, about 5 to 50, preferably about 10 to 20 parts of dispersant are used per 100 parts of base polyol in preparing the polymer polyol. The use of the dispersant in these ranges provides the polymer polyol with excellent stability and low viscosity at reasonable cost.

Optionally, a chain transfer agent or other materials known to be useful in preparing dispersions of polymer particles in a continuous phase may be employed in the preparation of the polymer polyol. Of particular interest is the use of triiodoorganic compounds and/or inorganic iodine-releasing compounds, particularly iodine itself, as described in U.S. Pat. Nos. 4,581,418 and 4,574,137, both incorporated herein by reference. The use of these materials further aids in reducing the viscosity of the polymer polyol.

The polymerization of the monomers in preparing the polymer polyol are generally described with respect to the preparation of the dispersant. It is generally important to agitate the reaction mixture in known manner to ensure proper particle formation. It is also preferred to use a free radical initiator in conducting the reaction. The free radical initiator can be used as a means for controlling the molecular weight of the polymerized monomers. Typically, about 0.05 to about 10, preferably about 0.2 to about 5, more preferably about 0.25 to about 3 and most preferably about 0.25 to about 1 part by weight of a free radical initiator are used per 100 parts of monomer. Use of a free radical initiator within these ranges, and especially within the preferred ranges, tends to provide for reduced viscosity in the polymer polyol. The use of a relatively low amount of free radical initiator as in the most preferred range is a substantial advantage of this invention, as it significantly reduces the raw material costs.

It is preferred to conduct the polymerization reaction of the monomers to form the polymer polyol in a continuous addition process, although a batch operation is possible. In a particularly preferred embodiment, the reaction is conducted by continuously adding, in separate streams, the monomer(s) and the dispersant to a reaction vessel which is heated to the polymerization temperature. In this embodiment, the base polyol may be all in the reaction vessel at the start of the reaction, or may be continuously added to the reactor along with the other materials. When a continuous addition process is used, it is preferred to continuously add the free radical initiator along with the dispersant and/or base polyol.

When the monomer, dispersant and/or base polyol are added continuously to the reaction vessel, such addition is typically conducted over a period of about 10 minutes to about 6 hours.

After all reactants are added to the reaction vessel, it is common practice to digest the reaction mixture at the reaction temperature for a period, typically about 0.5 to about 3 hours, to complete the polymerization. Following the polymerization reaction, it is advantageous to remove any unreacted monomer from the polymer polyol using any suitable technique such as vacuum stripping.

The process of this invention provides a polymer polyol which, for a given solids level, exhibits a surprisingly low viscosity. Accordingly, this process provides a means for preparing high solids polymer polyols which have a viscosity sufficiently low for their processing into polyurethanes using conventional equipment. The particles are also well stabilized against agglomeration and settling.

If a lower solids polymer polyol is desired, the polymer polyol of this invention can be diluted with a polyol which is compatible with the base polyol. The advantages of diluting the polymer polyol are described in U.S. Pat. No. 4,431,754.

The polymer polyol of this invention can be reacted with a polyisocyanate in conventional manner to form a polyurethane. Such reaction can be carried out in the presence of blowing agents, surfactants, catalysts, chain extenders, additional polyols, stabilizers, fillers, pigments as well as other additives which are useful in the preparation of polyurethanes.

Polyisocyanates suitable for use with the polymer polyol of this invention include aliphatic, aromatic and cycloaliphatic polyisocyanates. Exemplary aromatic polyisocyanates include 2,4- and/or 2,6-toluenediisocyanate (TDI), p-phenylene diisocyanate, naphthylene diisocyanate, diphenylmethanediisocyanate (MDI) and derivatives thereof and the like. Toluene diisocynate is most preferred.

Exemplary aliphatic and cycloaliphatic polyisocyanates include tetramethylene diisocyanate, hexamethylene diisocyanate, 1,4-cyclohexane diisocyanate, tetramethylxylene diisocyanate and isophorone diisocyanate, as well as the hydrogenated derivatives of the afore-mentioned aromatic polyisocyanates.

In addition to the foregoing, crude polyisocyanates as disclosed in U.S. Pat. No. 3,215,652, and isocyanate-terminated prepolymers and quasiprepolymers prepared in the reaction of a stoichiometric excess of the polyisocyanate and a polyol having an equivalent weight of about 31–2000 are useful herein.

In preparing a polyurethane foam with the polymer polyol of this invention, the polymer polyol may be reacted with the polyisocyanate in the presence of a blowing agent to form a foam. In contrast to such a "one-shot" process, the polymer polyol can be prereacted with a stoichiometric excess of polyisocyanate to form an isocyanate-terminated prepolymer which is then reacted with water to form a foam.

In addition to water, low boiling organic compounds, notably the halogenated alkanes, are useful blowing agents.

Any suitable urethane catalyst can be used to prepare polyurethanes from the polymer polyol. Notable are the tertiary amines and organometallic catalysts. Suitable such catalysts are described in U.S. Pat. Nos. 4,390,645 and 2,846,408.

The foam can be used to prepare padding, energy-absorbing devices, balls, automobile dashboards, head lights and the like. In addition to foams, noncellular elastomers can be prepared from the polymers polyol of the inventions. The foams are characterized by having excellent load-bearing.

The following examples are provided to illustrate the invention but not to limit the scope thereof. All parts and percentages are by weight unless otherwise indicated.

EXAMPLE 1

A. Preparation of Vinyl-terminated Adduct

To a three-liter, 3-necked round-bottomed flask equipped with an addition funnel, stirrer, condenser and thermocouple are added 2400 g (0.5 mole) of a 4800 molecular weight ethylene oxide-capped poly(propylene oxide) triol (hereinafter Polyol A). The polyol is heated to 70° C. and 15 grams (0.1 mole) of isocyanatoethyl methacrylate (IEM) are added with stirring. Dibutyltin dilaurate catalyst (0.1 gram) is added as a catalyst, and the reaction is allowed to proceed at about 70° C. until all the isocyanate groups have reacted, as determined by infrared spectroscopy. The resulting vinyl-terminated adduct is a viscous liquid.

B. Preparation of Dispersant

Using a reactor as described in section A of this example, with the addition, of a nitrogen sparge, 200 grams of Polyol A are heated to 120° C. under a nitrogen atmosphere. With stirring, a mixture of 5 g. azobisisobutyronitrile, 15 g. acrylonitrile, 35 g. styrene and 2200 g. of the vinyl-terminated adduct from Example 1-A are added with stirring over a three-hour period. The product is then stripped to remove volatile monomers and cooled to room temperature. The resulting dispersant has a viscosity of 1385 centipoises (cps), as measured on a Brookfield Model RVF viscometer using a #2 spindle at 10 rpm. By contrast, Polyol A itself has a Brookfield viscosity of about 800 cps at 25° C.

C. Preparation of Polymer Polyol

Using a reactor as described in Example 1-B, 1000 g. of Polyol A and 200 g. of the dispersant prepared in Example 1-B are heated to 120° C. with stirring. To the heated mixture are added, over a period of 70 minutes while maintaining the temperature at 120° C., a mixture of 6 g. azobisisobutyronitrile, 75 g. acrylonitrile and 225 g. styrene. The reaction mixture is heated at 120° C. for an additional 30 minutes following the addition of the monomers, after which the product is vacuum stripped to remove any unreacted volatile monomers. The product polymer polyol contains 20 weight-% solids and has a Brookfield viscosity of 1993 cps as measured at 25° C. on a Brookfield model RVF viscometer using spindle #2 at 10 rpm.

D. Preparation of Flexible Polyurethane Foam

A portion of the polymer polyol prepared in Example 1-C is diluted to 12% solids with a polyol similar to Polyol A except it contains somewhat greater EO capping. To 100 parts of the diluted polymer polyol are added 3.8 parts of water, 0.375 parts of a 33% active triethylene diamine solution, 1.7 parts diethanol amine, 1.7 parts of a silicone surfactant, 0 1 parts of an amine catalyst, 0.005 parts of an organotin catalyst and sufficient of an 80/20 mixture of 2,4-and 2,6-toluene diisocyanate to provide an isocyanate index of 100. This mixture is poured into a 15"×15" mold which is preheated to 140°–145° C. and cured at that temperature for 6 minutes. The foam is then crushed to 2.5" and then to 1.5". The resulting foam has excellent properties.

EXAMPLE 2

A. Preparation of Vinyl-terminated Adduct

In a suitable reactor are placed 900 parts of a 4750 molecular weight triol prepared by reacting a trihydric initiator with a mixture of 87% propylene oxide and 13% ethylene oxide (hereinafter Polyol B). To the reactor are also added 11.82 parts isocyanatoethyl methacrylate and the resulting mixture is heated to 60°–70° C. Then, 0.05 parts of an organotin catalyst are added and the mixture is permitted to react at the stated temperature for 4 hours. The resulting adduct is used in Example 2-B following.

B. Preparation of Dispersant

To a reactor equipped with a mechanical stirrer, condenser, thermocouple and addition tubes are added 600 parts of a 3100 molecular weight triol prepared by reacting a trihydric initiator with a mixture of 87% propylene oxide and 13% ethylene oxide (hereinafter Polyol C). The reactor is then heated to 125° C. and padded with nitrogen. To the reactor are simultaneously fed, over 90 minutes, a first stream containing 2597 parts of the adduct prepared in Example 2-A and 7.2 parts of azobisisobutyronitrile and a second stream containing 84 parts styrene and 36 parts acrylonitrile. Following the reaction, a clear solution of the dispersant in Polyol C is obtained which has a Brookfield viscosity of 2400 cps.

C. Preparation of Polymer Polyol

To a reactor as described in Example 2-B are added 489 parts of Polyol C and 79 parts of the dispersant of Example 2-B. This mixture is heated to 130° C. under a nitrogen sparge. To the reactor are then added a first feed stream containing 1047 parts of Polyol C, 120 parts of the dispersant and 28.5 parts of azobis-isobutyronitrile, a second stream containing 997.5 parts styrene and a third stream containing 427.5 parts acrylonitrile. Each stream is started at the same time. The monomer streams are added over 70 minutes and the first stream is added over 75 minutes. After the additions are complete, the reaction mixture is heated at 130° C. for an additional hour, after which any unreacted volatile monomers are vacuum stripped. The resulting polymer polyol contains 44.3% solids and has a Brookfield viscosity of 6810 cps. at 25° C. The average particle size is 736 nm.

EXAMPLES 3–5

A series of vinyl-terminated adducts are formed according to the procedure described in Example 2-A, except that the mole ratio levels of isocyanatomethacrylate (IEM) capping is varied as indicated in Table I following. Each adduct is then formed into a dispersant, and then used to prepare a polymer polyol as described in Examples 2-B and 2-C. The polymer polyols are prepared such that the IEM content of the copolymer polyol is the same in all cases. The viscosity of both the dispersant and the polymer polyol produced therefrom are reported in Table 1. The data from Example 2 is included for comparison.

TABLE I

| Example No. | IEM level[1] | Dispersant Viscosity[2] | Polymer Polyol Viscosity[2] | % Solids |
|---|---|---|---|---|
| 2 | 0.4 | 2,400 cps | 6,810 cps | 44.3 |
| 3 | 0.2 | 1,050 cps | 11,800 cps | 43.8 |
| 4 | 0.6 | 8,100 cps | 19,280 cps | 45.4 |
| 5 | 1.0 | >50,000 cps | could not form dispersion | — |

[1] Moles IEM per mole of polyol used in preparing the vinyl-terminated adduct.
[2] All viscosities measured on a Brookfield Model RVF viscometer at 25° C.

It can be seen, therefore, that in this formulation, optimum polymer polyol viscosity is achieved when about 0.4 mole of IEM is used per mole of polyol to form the dispersant. At higher IEM capping levels, the viscosity of the product increases. Similar experimentation shows that when the styrene and acrylonitrile are omitted in the preparation of the dispersant, the optimum IEM capping in the adduct level increases to about 0.6–1.0 moles of IEM per mole of polyol used to form the dispersant.

EXAMPLE 6

A polymer polyol is prepared in the same manner as described in Example 2, except the initiator level in the preparation of the polymer polyol is reduced to about 5.7 parts. The product has a viscosity of 6,000 cps at 43.9% solids. Average particle size is 706 nm. It is thus seen that the process of this invention permits the use of very low initiator levels in preparing the polymer polyol.

EXAMPLE 7

Following the procedures described in Example 2-A, a vinyl-terminated adduct is prepared. This adduct is used to prepare a dispersant in the manner described in Example 2-B, with the exception that 7.2 parts of iodine (I) are added to the first stream. A polymer polyol is prepared using this dispersant by charging a reactor as described in Example 1-B with 489 parts of Polyol C and 79 parts of the dispersant. This mixture is heated to 130° C. under a nitrogen sparge. To the mixture are then added a first stream containing 691 parts Polyol C, 120 parts of the dispersant and 28.5 parts of azobisisobutyronitrile, a second stream containing 356 parts Polyol C and 3.6 parts iodine, a third stream containing 997.5 parts styrene and afourth stream containing 427.5 parts acrylonitrile. Feeding of all streams is begun simultaneously, with the monomer streams being fed over 65 minutes and the first and second streams being fed over a slightly longer time. Following the additions, the reaction mixture is heated at 130° C. for an additional hour. The resulting polymer polyol containing 43.8% solids and has a Brookfield viscosity of 5040 cps at 25° C. Average particle size is 673 nm.

EXAMPLE 8

A vinyl-terminated adduct is prepared and used to prepare a dispersant according to the method described in Example 2-A and 2-B. To a reactor are charged 69.1 parts of the stabilizer and 518.1 grams of Polyol D (a 4700 molecular weight ethylene oxide-capped poly(propylene oxide) triol. After heating to about 130° C., three fed streams are simultaneously begun. The first stream contains 619 g styrene, and is added over 66 minutes. The second stream contains 210 g acrylonitrile and is added over 66.5 minutes. The third stream contains 72.9 g of the dispersant, 8.3 g of azobisisobutyronitrile and 593 grams of Polyol D. It is added over 71 minutes. After digestion and stripping as described in Example 2-C, the product copolymer polyol is recovered. The product has a Brookfield viscosity of 2450 cps at 34.61% solids. This viscosity is considered excellent since a higher viscosity base polyol is used than in Examples 1–7. The copolymer polyol is useful in preparing molded polyurethane foams.

EXAMPLE 9

Example 8 is repeated, except the first and second streams are replaced with a single stream containing 819 grams of styrene. The product has a Brookfield viscosity of 3620 cps at 34.63% solids.

EXAMPLE 10

A. Preparation of Vinyl-terminated Adduct

Following the procedures described in Example 2-A, a vinyl-terminated adduct is prepared.

B. Preparation of Dispersant

To a reactor equipped with mechanical stirrer, condenser, thermocouple and addition funnel as added 200 parts of polyol B. The reactor is then heated to 130° C. under a nitrogen blanket. To the reactor are added a solution of 2200 parts of the adduct from Example 10-A, 105 parts sytrene, 45 parts acrylonitrile, 15 parts azobisisobutyronitrile and 120 parts carbon tetrachloride. The addition is complete after one hour. After an additional 0.25 hour cookdown, the mixture is stripped of volatile organics under vacuum. The final product is a clear liquid with a Brookfield viscosity of 4200 cps at 25° C.

C. Preparation of Polymer Polyol

To the reactor of Experiment 10-B are added 350 parts polyol C and 75 parts of dispersant from example 10-B. This mixture is heated to 130° C. under a nitrogen sparge. To the reactor is added a feed stream consisting of 420 parts styrene, 180 parts acrylonitrile, 12 parts azobisisobutyronitrile, 75 parts of dispersant from Example 10-B, and 250 parts of Polyol C. The addition is complete after one hour and after an additional 0.5 hour cookdown at 130° C. the mixture is stripped of volatile organics under vacuum. The final product has a Brookfield viscosity of 7960 cps at 25° C.

EXAMPLE 11

A. Preparation of Vinyl-Terminated Adduct

In a suitable reactor are placed 900 parts of Polyol B. To the reactor are added 17.7 parts of IEM, and the resulting mixture is heated to 60°–70° C. Then 0.08 part of an organotin catalyst is added and the mixture permitted to react at the stated temperature for about 4 hours.

B. Preparation of Dispersant

To a suitable reactor as described in Example 2-B are added 600 parts of Polyol C. The polyol is heated to 125° C. and padded with nitrogen. To the reactor are added, over a period of about 1 hour, 2640 parts of the adduct prepared in Example 11-A and 37.8 parts of azobisisobutyronitrile. Following the reaction, a clear solution is obtained which has a Brookfield viscosity of 1330 centipoises at 25° C.

C. Preparation of Polymer Polyol

To a reactor as described in Example 2-C are added 512 parts of Polyol C and 56 parts of the dispersant as described in Example 11-B. This mixture is heated to 130° C. under a nitrogen sparge. To the reactor are then added a first feed stream containing 1082 parts of Polyol C, 85 parts of the dispersant and 28.5 parts of azobisisobutyronitrile, a second stream containing 997.5 parts styrene and a third stream containing 427.5 parts acrylonitrile. Addition of each stream is started at the same time, with the first stream being added over 90 minutes and the second and third streams being added over 60 minutes. After the additions are complete the reaction mixture is heated at 130° C. for an additional hour after which any volatile impurities are vacuum stripped. The resulting polymer polyol contains 42.0 wt.-% solids and has a Brookfield viscosity at 25° C. of 9,040 centipoises. The average particle size is 686 nanometers in diameter.

What is claimed is:

1. A process for preparing a polymer dispersion in a continuous polyol phase comprising the steps of
   (a) forming in a first step a dispersant by homopolymerizing a vinyl-terminated adduct, or copolymerizing said adduct with at least one ethylenically unsaturated monomer, in the presence of an active hydrogen-containing compound as a solvent under conditions such that the resulting dispersant is soluble in a base polyol and has a Brookfield viscosity of less than about 25,000 centipoises at 25° C. as a 20–35 wt.-% solution in an active hydrogen-containing compound, and then in a second step
   (b) polymerizing an ethylenically unsaturated monomer or mixture thereof in the presence of said dispersant and a base polyol under conditions such that the polymerized monomer forms a plurality of particles which are stabilized against agglomeration by the disperant.

2. The process of claim 1 wherein said dispersant has a viscosity of about 300 to about 8000 centipoises.

3. The process of claim 1 wherein said adduct is represented by the structure

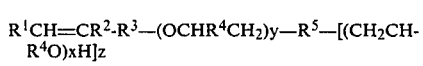  (1)

wherein $R^1$ is hydrogen, inertly substituted lower alkyl, nitrile, $R^8$—OOC— or $R^8{}_2$NCO—, wherein each $R^8$ is independently hydrogen, inertly substituted lower alkyl, or polyoxyalkylene, $R^2$ and $R^4$ are each independently hydrogen or inertly substituted lower alkyl, $R^3$ is a divalent radical which activates the terminal vinyl group towards polymerization, $R^5$ is the residue of a polyhydric inititator when x is greater than zero and the ressidue of a monohydric initiator bond x is zero, y is a number from about 1 to about 100, x is a number from about 0 to about 100 and z is a number from about 1 to about 3.

4. The process of claim 3 wherein said adduct is the reaction product of a polyether polyol and about 0.2–0.6 moles of an ethylenically unsaturated isocyanate per mole of polyol.

5. The process of claim 1 wherein an ethylenically unsaturated monomer is employed in step (a), and such monomer comprises a monovinyl aromatic, an ethylenically unsaturated nitrile, or mixture thereof.

6. The process of claim 4 wherein step (a) is conducted in the presence of a free radical initiator.

7. The process of claim 6 wherein step (a) is conducted by the continuous addition of monomer under polymerization conditions.

8. The process of claim 3 wherein step (b) is conducted in the presence of a free radical initiator.

9. The process of claim 8 wherein the monomer employed in step (b) comprises a monovinyl aromatic, an ethylenically unsaturated nitrile, or mixture thereof.

10. The process of claim 9 wherein step (b) is conducted by the continuous addition of monomer under polymerization conditions.

11. The process of claim 2 wherein said adduct is represented by the structure

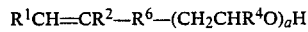

wherein $R^1$ is hydrogen, inertly substituted lower alkyl, nitrile, $R^8$—OOC— or $R^8{}_2$NCO—, wherein each $R^8$ is independently hydrogen, inertly substituted lower alkyl or polyoxyalkylene, $R^2$ and $R^4$ are each independently hydrogen or inertly substituted lower alkyl, $R^6$ is a divalent radical which activates the vinyl group toward polymerization and together with the terminal vinyl group is the residue of an active hydrogen-containing initiator compound and a is a number from about 1 to about 100.

12. The process of claim 1 wherein the polymer polyol has a viscosity of less than 10,000 cps.

13. The process of claim 12 wherein the polymer polyol has a solids content of 35–50% by weight.

14. The process of claim 8 wherein said free radical initiator is employed in step (b) in an amount from about 0.25 to about 1% based on the weight of the monomer or mixture thereof.

15. The process of claim 1 wherein said adduct is homopolymerized in step (a).

16. The process of claim 3 wherein said adduct is homopolymerized in step (a).

17. The process of claim 11 wherein said adduct is homopolymerized in step (a).

18. A process for preparing a polymer dispersion in a continuous polyol phase comprising the steps of
(a) forming a dispersant by homopolymerizing a vinyl-terminated adduct, or copolymerizing said adduct with an ethylenically unsaturated monomer or mixture thereof under conditions such that the resulting dispersant is soluble in a base polyol and has a viscosity of less than about 25,000 centipoises, and then
(b) polymerizing an ethylenically unsaturated monomer or mixture thereof in the presence of said dispersant and a base polyol under conditions such that the polymerized monomer and said dispersant form a plurality of particles dispersed in said base polyol.

* * * * *